United States Patent [19]
Roesel, Jr. et al.

[11] Patent Number: 6,020,712
[45] Date of Patent: Feb. 1, 2000

[54] ROTOR CONTROL FOR SYNCHRONOUS AC MACHINES

[75] Inventors: John F. Roesel, Jr.; Ronnie J. Barber, both of Bradenton, Fla.

[73] Assignee: Precise Power Corporation, Bradenton, Fla.

[21] Appl. No.: 09/028,139

[22] Filed: Feb. 23, 1998

[51] Int. Cl.[7] ........................................ H02P 1/46
[52] U.S. Cl. .................. 318/705; 318/720; 318/148; 310/156; 310/162
[58] Field of Search ................... 318/700–724, 318/140–158; 310/156, 265, 162, 163

[56] References Cited

U.S. PATENT DOCUMENTS

| | | |
|---|---|---|
| 2,113,102 | 4/1938 | Whittle . |
| 3,931,535 | 1/1976 | Roesel, Jr. . |
| 4,065,703 | 12/1977 | Schlicher et al. ...................... 318/711 |
| 4,168,459 | 9/1979 | Roesel, Jr. . |
| 4,177,414 | 12/1979 | Roesel, Jr. et al. . |
| 4,227,136 | 10/1980 | Roesel, Jr. . |
| 4,406,950 | 9/1983 | Roesel, Jr. . |
| 4,412,170 | 10/1983 | Roesel, Jr. . |
| 4,600,873 | 7/1986 | Roesel, Jr. et al. . |
| 4,663,536 | 5/1987 | Roesel, Jr. et al. . |
| 5,068,587 | 11/1991 | Nakamura . |
| 5,254,894 | 10/1993 | Satake et al. . |
| 5,281,879 | 1/1994 | Satake et al. . |
| 5,355,069 | 10/1994 | Bahn ....................................... 318/701 |
| 5,635,810 | 6/1997 | Goel ....................................... 318/723 |
| 5,754,024 | 5/1998 | Sugiyama ............................... 318/701 |

*Primary Examiner*—David Martin
*Attorney, Agent, or Firm*—Quarles & Brady LLP

[57] ABSTRACT

An AC machine comprises: a motor energized by an AC source subject to irregularities of frequency and voltage; a generator driven by the motor for supplying an AC output signal of substantially constant frequency and voltage, the generator having a rotor with a layer of a re-magnetizable, relatively high coercive magnetic material on the rotor and a stator of a soft magnetic material having a pole piece and an excitation coil on the pole piece, the stator and the rotor rotating relative to one another with a clearance enabling rotor poles to be formed on the re-magnetizable layer by current energizing the excitation coil; and, a control signal generator responsive to at least one of the AC output signal and a signal representative of the current energizing the excitation coil for generating pulses of programmed wave shapes which differ in at least one of width, phase and magnitude as necessary to modify the rotor poles during the irregularities of the AC source to maintain the substantially constant frequency and voltage of the AC output signal.

34 Claims, 8 Drawing Sheets

ROTOR CONTROL FOR SYNCHRONOUS AC MACHINES

CROSS REFERENCE TO RELATED APPLICATIONS

Not Applicable

STATEMENT REGARDING FEDERALLY SPONSORED RESEARCH OR DEVELOPMENT

Not Applicable

1. Field of the Invention

This invention relates to the field of synchronous alternating current (AC) machines, and in particular, to rotor pole control for synchronous AC machines forming non interruptible power supplies.

2. Description of Related Art

Conventional AC synchronous machines, such as motors or generators, are built with a fixed number of pairs of rotor poles of a predetermined pole face shape. The output frequency of the machine operating as a generator is set solely by the rotational speed of the rotor and number of poles. The generated voltage phase position is determined by the instantaneous location of the spinning rotor and the wave shape by the shape of the rotor pole face, the winding placement in the stator, skew in the stator, and load characteristics. Rotors for these machines may have poles with windings to produce an electromagnetic field or with permanent magnets to produce the rotor magnetic field. In the case of rotors with wound rotor poles, the generated voltage or electromotive force ("E.M.F.") of the machine is readily changed by varying the direct current level to the rotor pole windings. Increasing the current in the field windings increases the output voltage of a generator, or causes the input power factor to go more leading in the case of a motor. Machines with permanent magnet rotor poles allow much simpler rotor construction but field control is far more difficult.

A machine with frequency, voltage and phasing control is described in U.S. Pat. No. 4,177,414, which discloses a generator system for producing sine wave AC of a substantially constant selected frequency and of a substantially constant selected voltage. A rotating master generator generates a sine wave AC potential of a substantially constant selected frequency. At least one other rotating slave generator generates sine wave AC of an identical frequency to that of the master generator. The AC potential output of the master generator is combined in series with that of the slave generator. Electrical means phase shift the AC potential output of the slave generator with respect to that of the master generator so that the combined AC potentials of both generators is a sine wave AC having the selected voltage. The rotor of the master generator and the rotor of the slave generator each have at least one field core of a high permeability soft magnetic material. A surface of each field core has a layer of high coercive re-magnetizable hard magnetic material thereon and a stator operatively juxtaposed to each of the field cores. Each stator has a slotted core of high permeability, low-loss soft magnetic material. An excitation coil is disposed in slots in each stator core. Each excitation coil is energized with an AC potential of an identical frequency to that of the selected frequency. As a result, the layer of hard magnetic material on each of the juxtaposed rotating field cores is magnetized by the adjacent excitation coil into a pattern of magnetization, corresponding to the AC potential of that excitation coil. Primary windings in the other slots of each stator core generate an AC potential when the magnetized field cores rotate with respect to the wound stators. The means for phase shifting causes the AC potential energizing the excitation coil in the stator of the slave generator to be shifted in phase a predetermined amount with respect to the phase of the energizing AC potential supplied to the excitation coil in the master generator. Accordingly, the AC potentials generated by the primary windings in the stators of the master and slave generator are out of phase by an amount such that the combined resultant AC voltage is the selected voltage.

An improvement on the foregoing is described in U.S. Pat. No. 4,663,536, which discloses a relatively compact, quiet running and highly efficient motor-generator non interruptible power supply (NIPS), wherein a driving motor is energized from a source of AC electrical power which may be subject to irregularities or even complete power interruptions for varying periods of time. Nevertheless, the generator is capable of supplying to a load AC power of a substantially constant frequency and at a substantially constant voltage at all times when the source is delivering usable AC to the driving motor and for a substantial period of the order of many seconds during power interruptions. The NIPS has a synchronous motor and an AC generator on a supporting base. The synchronous motor has a stator mounted on a stationary shaft energized from the source of AC power to produce a rotating magnetic field. The motor has a rotor surrounding its stator, which is capable of rotating synchronously with the rotating magnetic field for driving the rotor of the AC generator. The AC generator has a high rotational inertia rotor. The rotor has a rotatable circular cylindrical shell member mounted for coaxial rotation on bearings on the supporting base. At least one body of soft magnetic material is affixed to the inside walls of the shell member. A layer of re-magnetizable high coercive (hard) magnetic material is attached to the body of soft magnetic material and has an exposed cylindrical surface coaxial with the axis of rotation of the shell. The generator also has a stator having a stationary shaft member fixed to the supporting base and disposed within and along the axis of the rotor member. At least one body of soft low-loss magnetic material having a slotted cylindrical surface is affixed to the stationary shaft member and has the slotted surface thereof juxtaposed to and substantially coextensive with the layer of hard magnetic material with a rotational clearance space therebetween. Two of the slots in each body have an intervening pole piece about which an excitation coil is placed. When the excitation coil is energized with single phase AC from a control means, the pole piece will produce a strong magnetic flux of alternating magnetic polarity. As a result, the juxtaposed layer of hard magnetic material will be magnetized during rotation into a selected pattern of north and south magnetic poles. A feedback winding and AC power generating windings are disposed in other slots in the stator body. Finally, the stator has circuit means for connecting the feedback winding to the excitation coil so that during synchronous rotation of the rotor any AC potential generated in the excitation coil by the passage of the magnetized poles in the layer is substantially suppressed by the AC voltage generated by the poles in the feedback winding.

The supporting base includes a casing enclosure within which is mounted the rotatable outer cylindrical shell having the high rotational inertia. The shell has separable sections, one of which has the motor rotor components affixed thereto and another one of which has the generator rotor components attached thereto. The shaft member supporting both the motor and generator stators is disposed within the cylindrical shell. Both of the stators are juxtaposed and aligned with their respective rotor components. Means join the sections into a rigid cylindrical shell body. Bearing members rotatably support the cylindrical shell about the shaft member. Flexible mounting means resiliently support the bearing members and the shaft member within the casing enclosure.

The control for the AC machine described in U.S. Pat. No. 4,663,536 provides a sine wave drive current of a precisely controlled frequency to the generator excitation coil. This control current magnetizes, or forms, a constant poles per second magnetic pattern in the hard magnetic layer of the rotor, thereby maintaining a controlled frequency output of the machine when the speed is changing. Output phasing control of the machine is accomplished by phase shifting this control signal. The magnitude of the control sine wave current must reach a minimum level to change the magnetic polarity of the existing rotor pole. This causes a lag typically of 30° to 60° between the new pole edge and exciter current, depending on the value of exciter current. This also results in higher exciter root means square ("rms") currents than are needed to form the rest of the magnetic pole on the rotor.

Accordingly, there has been a long felt need for an AC synchronous machine with the simpler construction of a permanent magnet rotor but with output voltage or generated EMF, frequency, phasing and pole shape control externally controllable and independent of rotational speed with the machine operating over a wide speed range.

It would be advantageous, particularly for certain applications, to be able to alter the relative magnetic strength of each individual magnetic rotor pole while the machine is operating.

It would also be advantageous to implement external rotor pole control, while the machine is operating, without unnecessarily high exciter rms currents.

Finally, it would be advantageous to provide the ability to combine a lower cost fixed pole permanent magnet rotor with a controlled pole rotor structure where only generated EMF control is needed.

SUMMARY OF THE INVENTION

The invention concerns an AC machine, which is includes an AC machine rotor with a layer of a re-magnetizable high coercive (hard) magnetic material provided thereon. An AC machine stator is also provided, the stator being made of a soft, low-loss magnetic material and provided with a pole piece. An excitation coil is fitted on the pole piece for generating a controlled magnetic exciter field. The stator and the rotor rotate relative to one another with a clearance enabling rotor magnetic poles to be formed in the layer of re-magnetizable hard magnetic material by current energizing the excitation coil. A control signal generator is provided and is responsive to at least one input signal for generating pulses of programmed wave shapes which are variable in phase, width, and magnitude as necessary to modify the magnetic rotor poles for controlling an electrical characteristic of the AC machine. A computer may advantageously be used to aid in the control pulse generator.

In one embodiment the machine rotor is provided with a second layer of re-magnetizable hard magnetic material and a second stator with a second pole piece and a second excitation coil on the second pole piece. The relative rotation of the second stator and the rotor enables a second set of rotor poles to be formed in the second layer of re-magnetizable hard magnetic material by current energizing the second excitation coil.

In one specific embodiment, the machine is an AC power generator and the electrical characteristic which is controlled can be an AC output voltage, frequency or both. In the case where the machine is an AC power generator, the control pulse generator is advantageously responsive to one or more feedback signals representing the AC output voltage; a feedback signal representative of the current energizing the excitation coil; machine status; a synchronizing signal from a rotor position pickup; a synchronizing signal from a stator winding energized by rotating permanent rotor poles.

Further, the machine is configured so that the control signal generator generates pulses for selectively (1) reforming leading and/or lagging edges of the rotor poles; (2) for selectively reforming a portion of a rotor pole; (3) for generating pulses to change the relative position of the rotor poles; (4) for generating pulses to maintain a constant ratio of poles per second at different rotor rotational speeds and (5) generating pulses of varying magnitude for modulating the relative magnetic strength of the layer of re-magnetizable hard magnetic material on the rotor.

In an alterative embodiment, the machine is an AC power generator which includes a rectifier circuit for converting an AC output to a DC output. In that case, the control signal generator can advantageously be configured to regulate the DC output by generating pulses of varying magnitude for modulating the relative magnetic strength of the layer of re-magnetizable hard magnetic material on the rotor.

In still another embodiment, the machine is an AC motor and the electrical characteristic which is controlled is input power factor. In this case, the control pulse generator is responsive to an appropriate feedback signal representative of an appropriate factor such as input power factor of the motor, power line frequency and phase, or both. Where power factor is to be controlled, the control signal generator generates pulses of varying magnitude for modulating the relative magnetic strength of the layer of re-magnetizable hard magnetic material on the rotor. The invention also concerns a method for controlling the input power factor in the manner described.

The invention also concerns a method for controlling an AC machine as described above. The method includes the steps of: supplying differing pulses of programmed wave shapes to the excitation coil for modifying the rotor poles; and varying the pulses in at least one of width, phase and magnitude as necessary to modify the rotor poles for controlling an electrical characteristic of the AC machine.

When the method is used in connection with an AC machine configured as an AC power generator, the electrical characteristic which is controlled is an AC output voltage magnitude, phase, frequency or all of these. The method further involves the step of varying the pulses in response to at least one feedback signal representing at least one of the AC output voltage; a feedback signal representative of the current energizing the excitation coil; machine status; a synchronizing signal from a rotor position sensor; a synchronizing signal from a stator winding energized by rotating permanent rotor poles; and (in the case where the AC output has been converted to DC by a rectifier circuit) a rectified DC output voltage and its associated ripple components. The method can further include the step of generating with the control signal generator pulses for (1) selectively reforming leading and/or lagging edges of the rotor poles; (2) generating with the control signal generator pulses for selectively reforming a portion of a rotor pole; (3)

generating with the control signal generator pulses to change the relative position of the magnetic poles in the rotor; (4) generating with the control signal generator pulses to maintain a constant ratio of poles per second at different rotor rotational speeds (5) generating with the control signal generator pulses of varying magnitude for modulating the relative magnetic strength of the layer of re-magnetizable hard magnetic material on the rotor.

DETAILED DESCRIPTION OF THE PREFERRED EMBODIMENTS

Figure 1:
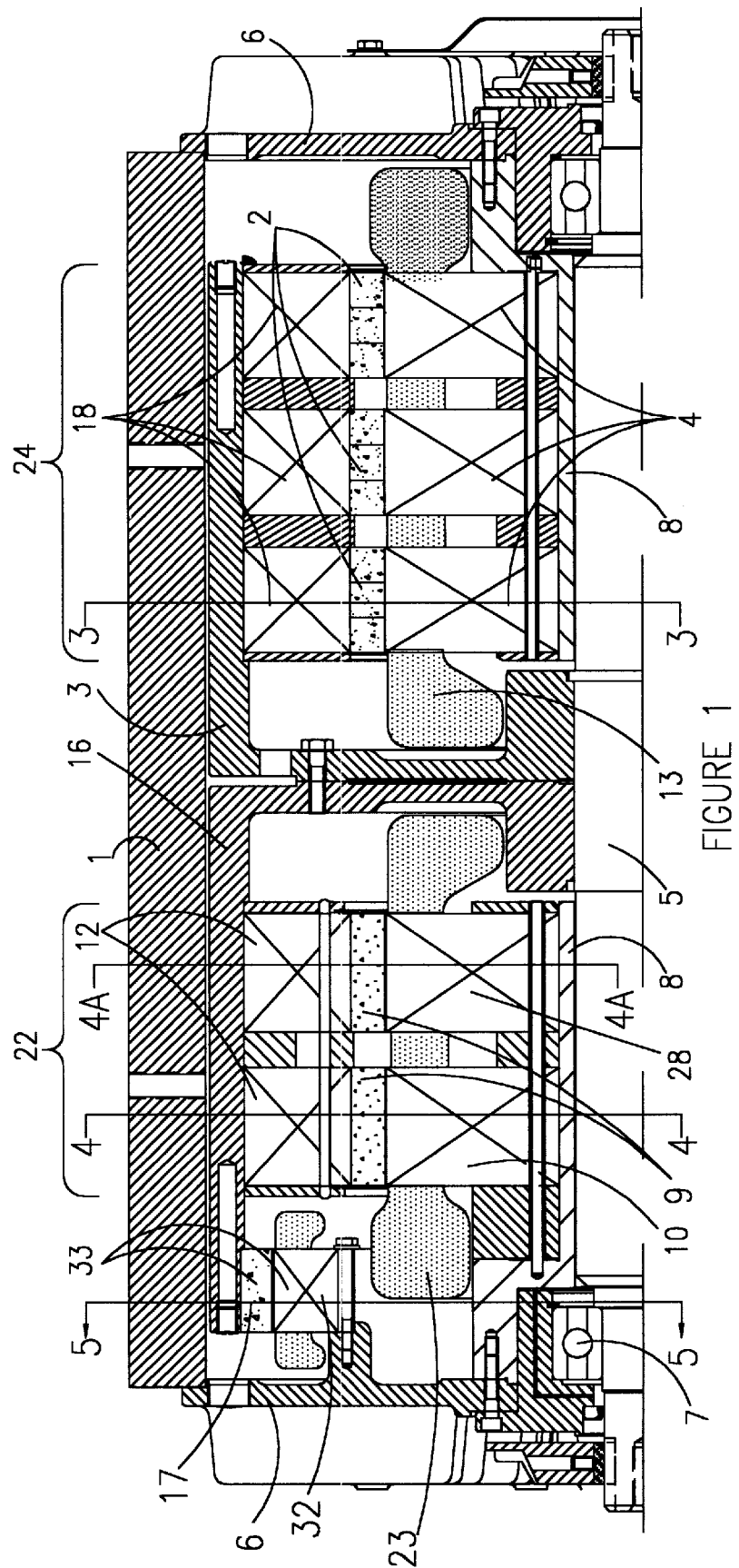
FIG. 1 is a longitudinal cross section, on one side of an axis of symmetry, of an AC machine which can utilize the improved rotor pole control according to the inventive arrangement.

A rotor pole control system according to an inventive arrangement provides an improvement over the kind of control system described in U.S. Pat. No. 4,663,536, which supplies a sine wave drive current of a precisely controlled frequency to the excitation coil of an AC machine operating as a NIPS. An AC machine operating as a NIPS, and similar to that described in U.S. Pat. No. 4,663,536, except for the improved control system taught herein, is shown in FIGS. 1 and 3–5. With reference first to FIG. 1, a frame 1 provides a housing for a controlled rotor pole motor 22, a controlled rotor pole generator 24 and a fixed pole auxiliary generator 33. The motor 22 comprises a motor rotor shell 16, primary motor stator 10, a secondary motor stator 28, a motor re-magnetizable hard magnetic layer 9, a rotor high permeability layer 12 and motor windings 23. The generator comprises a generator rotor including generator re-magnetizable hard magnetic layer 2, rotor high permeability layer 18, a rotor shell 3, and a generator stator assembly including stator 4, stator support 8, and generator windings 13. The motor and generator rotors rotate on a shaft 5 which turns in bearings 7. The frame or housing is closed at opposite longitudinal ends by end bells 6.

Figure 3:
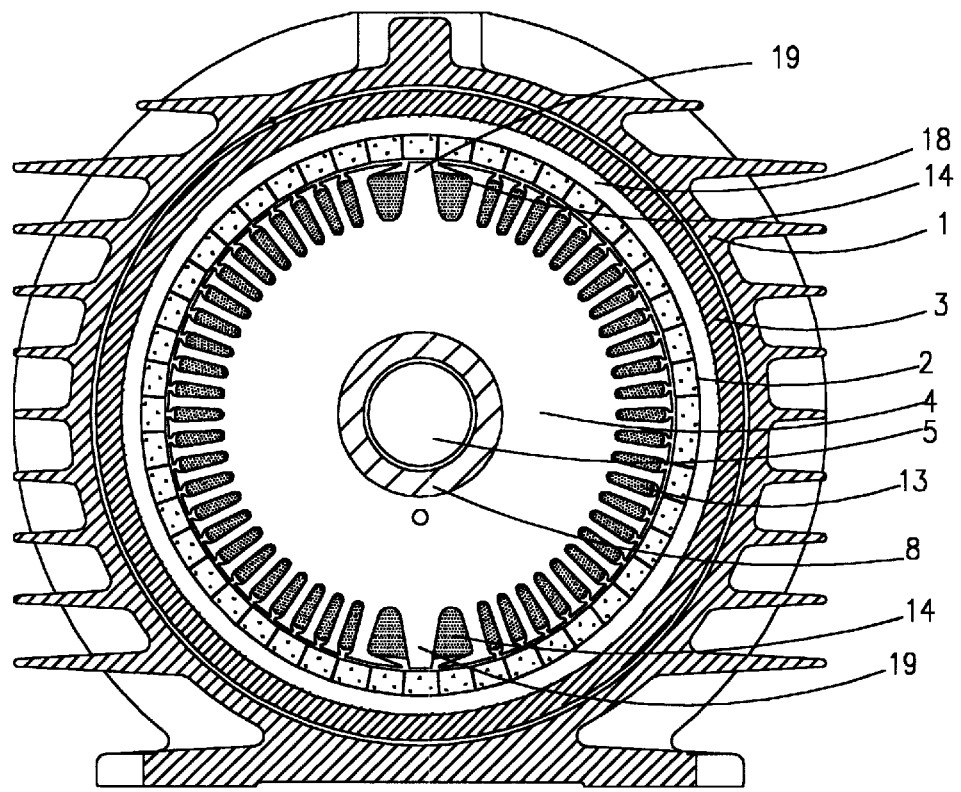
FIG. 3 is a cross section taken along the line 3—3 in FIG. 1 and 13, showing the generator controlled rotor pole portion of the AC machine.

FIG. 3 represents a cross sectional view of the machine in FIG. 1, taken along the line 3—3 in FIG. 1. As shown therein, the generator stator 4 is mounted on support 8, the stator 4 being formed of a soft, low-loss magnetic material and provided with one or more pole pieces 19. Generator windings 13 are provided in slots formed on the stator 4. Excitation coils 14 are fitted on the pole pieces 19 for generating a controlled magnetic exciter field. Preferably each portion of the stator 4 has its own excitation coils 14. The generator stator 4 and magnetic layer 2 rotate relative to one another with a clearance enabling rotor magnetic poles to be formed on the layer 2 of re-magnetizable hard magnetic material by current energizing excitation coil 14.

Figure 4:
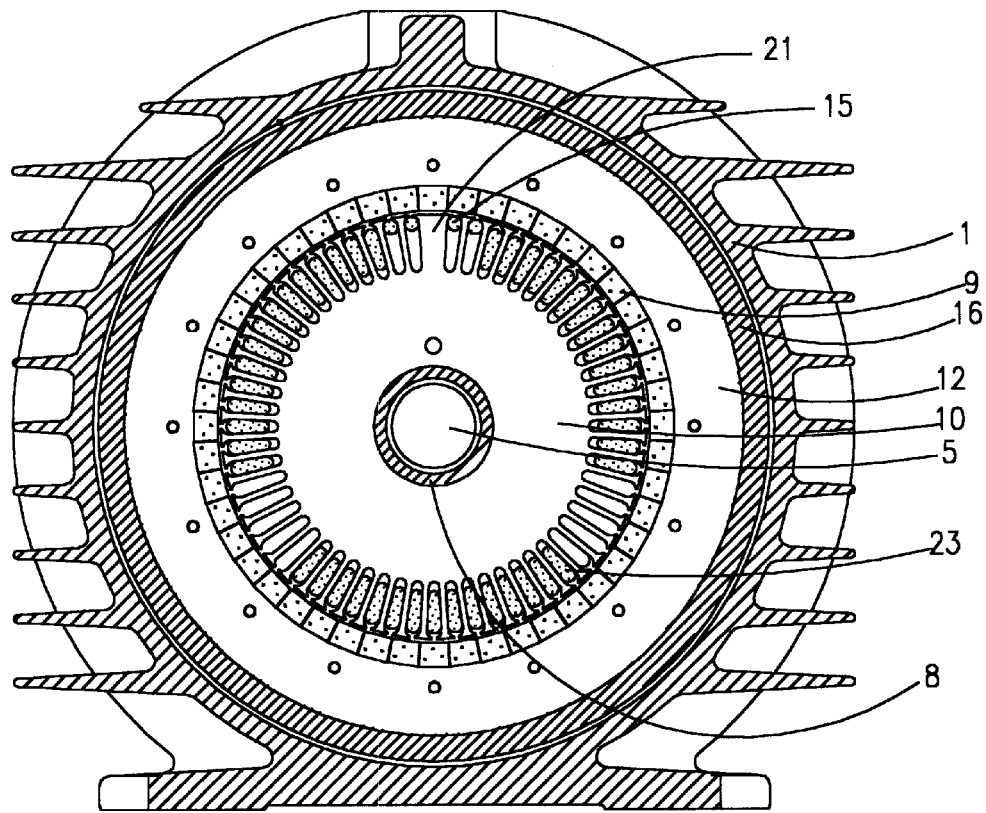
FIG. 4 is a cross section taken along the line 4—4 in FIGS. 1 and 13, showing the motor portion of the AC machine.
Figure 4A:
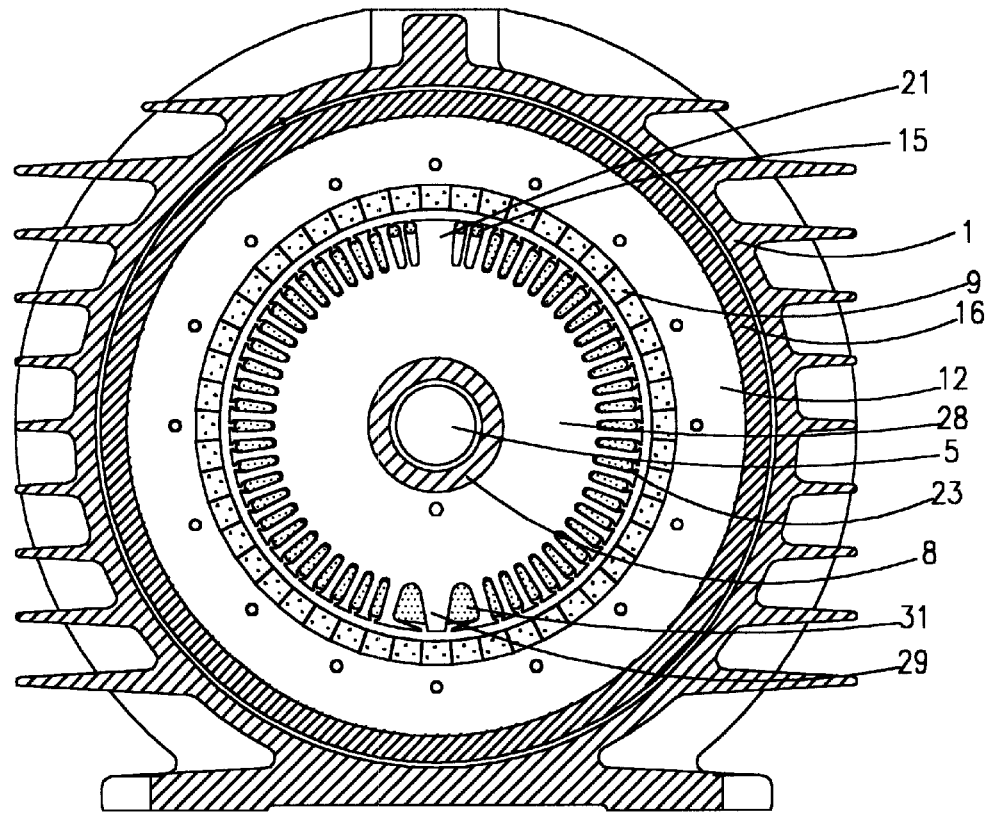
FIG. 4A is a cross section taken along the line 4A—4A in FIG. 1, showing the secondary stator in the motor portion of the AC machine.

FIG. 4 is a cross-sectional view taken along the line 4—4 in FIG. 1 showing the motor portion of the machine. The primary motor stator 10 of FIG. 1 is mounted on support 8, the motor stator being formed of a soft, low-loss magnetic material and provided with a pole piece 21. Motor windings 23 are provided in longitudinal slots formed on the primary motor stator 10. A main motor excitation coil 15 is preferably fitted on the motor pole piece 21 for generating a controlled magnetic exciter field. As shown in FIG. 4A, secondary stator 28 also contains a pole piece 21 with exciter slots aligned with those in FIG. 4 to allow the main exciter coil 15 to be wound through both of the adjacent stators. The main exciter coil 15 is used to provide magnetic rotor pole control for primary motor stator section 10 and secondary motor secondary stator 28 during acceleration of the motor to synchronous speed. The main exciter coil 15 preferably extends the length of each of the stator sections 10, 28. The motor stator 10, 28 and magnetic layer 9 rotate relative to one another with a clearance enabling rotor magnetic poles to be formed on the layer 9 of re-magnetizable hard magnetic material by current energizing main excitation coil 15.

It should be noted that exciter pole pieces as used herein can have a concentrated design, such as pole piece 19 in FIG. 3, or distributed design, such as pole piece 21 as shown in FIG. 4. Each design will satisfy somewhat different machine performance goals. The distributed design in FIG. 4 is less expensive to manufacture but tends to provide decreased performance as concerns field strength and pole edge definition. Accordingly, while it is preferable not to use such a distributed design in the generator section 24 of the machine, performance is sufficient for the motor section 22. Significantly, however, the invention is not limited in this regard and it should be understood that either type of exciter pole piece can be used in the motor and in the generator.

Figure 5:
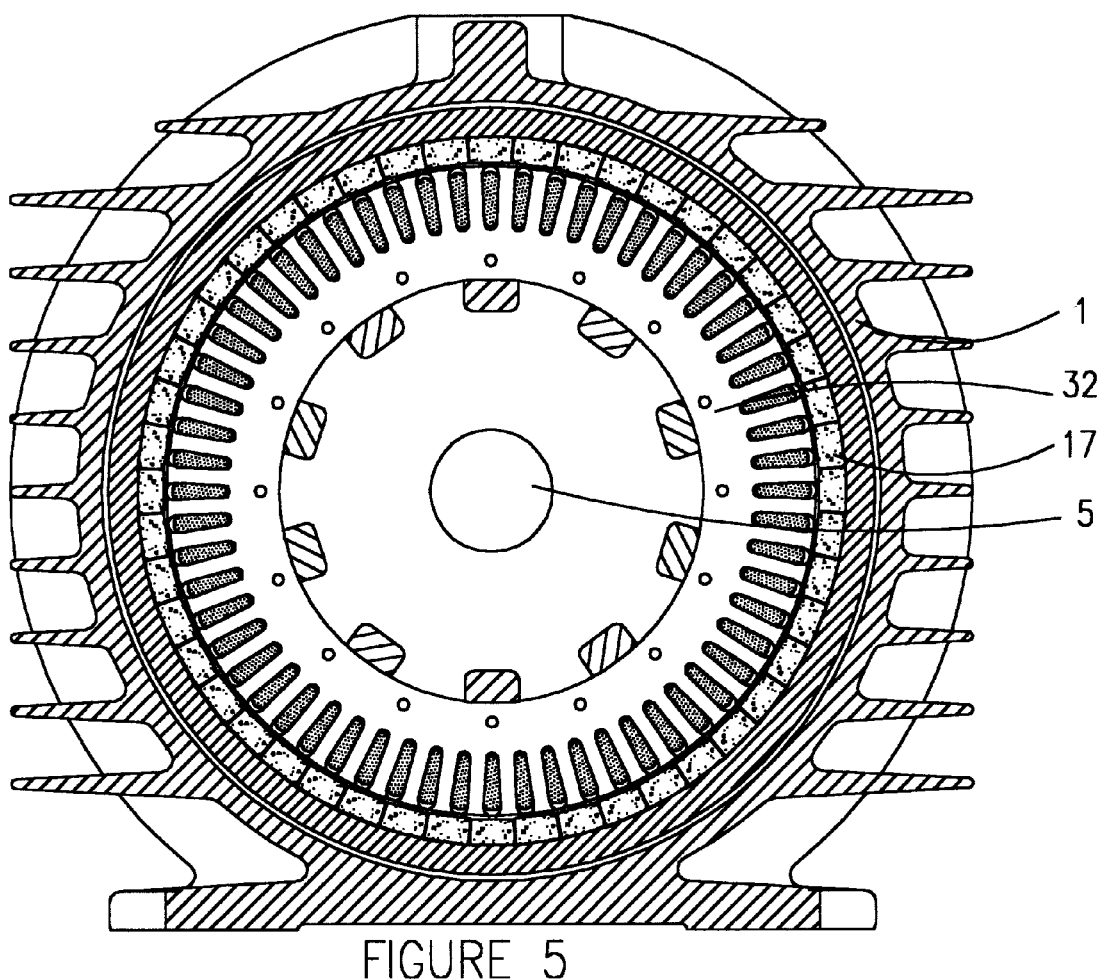
FIG. 5 is a cross section taken along line 5—5 in FIG. 1, showing a fixed pole generator portion of the AC machine.
Figure 7:
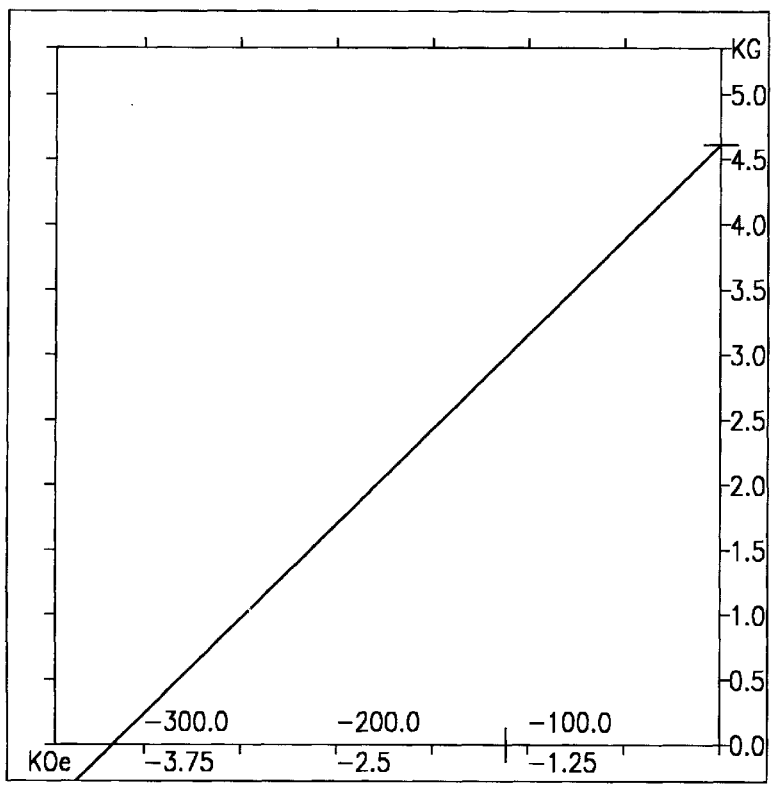
FIG. 7 is a first plot useful for explaining second quadrant magnetic hysteresis loops for the rotor permanent magnetic material in the AC machines.

FIG. 5 shows a fixed pole auxiliary generator 33 for powering the exciter control circuitry used in accordance with the present invention. The magnetic material 17 has typical magnetic characteristics as shown in FIG. 7. This magnetic material has a high value of coercive force, and typically is magnetized prior to installation. Magnetic material 17 may be comprised of any of a variety of well known high energy ferrite ceramic magnetic materials. However, the invention is not limited in this regard and it may be desirable to use higher energy materials depending upon the particular application requirements. For example, such materials may include $SmCo_5$, $RSm_2O_{17}$, or NdFeB as are well known to those in the field of high energy magnetic materials.

As shown in FIG. 5, the fixed pole auxiliary generator 33 preferably includes a fixed pole stator 32 and a permanent magnet layer 17. However, the invention is not limited in this regard, and the fixed pole auxiliary generator 33 can also be configured as a controlled pole generator as shall hereinafter be described.

Figure 8:
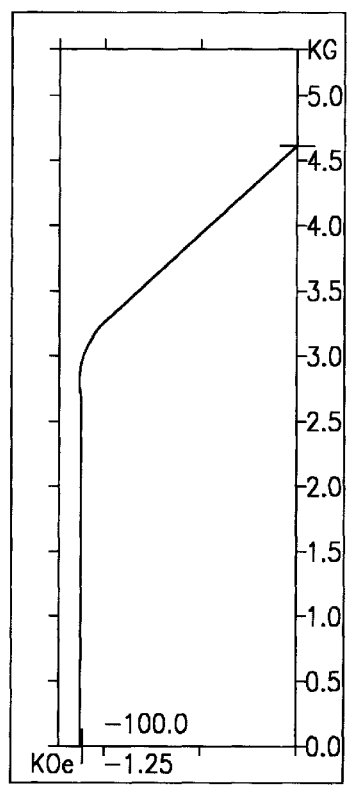
FIGS. 8 is a second plot useful for explaining second quadrant magnetic hysteresis loops for the rotor re-magnetizable hard magnetic material in the AC machines.

The magnetic material 2, 9 used in the machine shown in FIG. 1 has typical magnetic characteristics as shown in FIG. 8. This magnet material has a value of coercive force that allows the magnetic layer to be readily magnetized or re-magnetized in an operating machine by the exciters shown. The value of the coercive force is preferably chosen to allow efficient rotor pole reforming while retaining machine capability of operating at full load without the magnetic layer being demagnetized by the stator winding current.

The motor 22 in FIG. 1 can be configured to operate on single or three-phase AC electric distribution systems and drive high permeability layer 12 and rotor shell 16, which are connected to the rotor shell 3 of the output generator 24. The high inertia of shell 16 and layer 12 of the motor, together with the high inertia of generator rotor shell 3 and high permeability layer 18, allow output power to be maintained for 5–10 seconds or more after a power loss to the motor 22, thereby protecting a critical load from disturbance. The motor 22 is normally built as a controlled-pole machine as described in patent application WO 95/34117.

Figure 12:
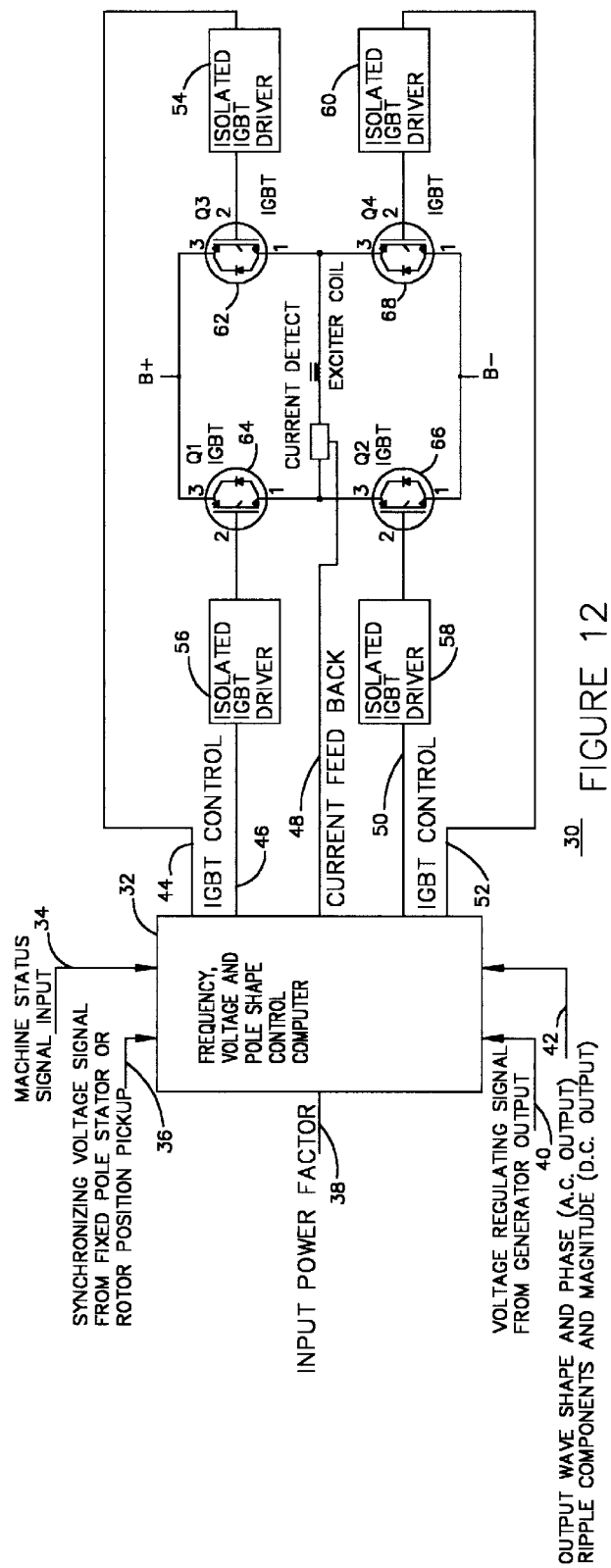
FIG. 12 is a block diagram of a driver circuit for supplying programmed control currents in accordance with the inventive arrangement.

According to a preferred embodiment of the invention, one or more control signal generators such as the one shown in FIG. 12, are provided for driving current through the generator and motor excitation coils 14 and 31. Motor exciter coil 15 may be driven by a control signal generator 12, but more preferably is energized by a resonant circuit or directly from the input power as shown in WO 95/34117, or U.S. Pat. No. 4,663,536. As shall hereinafter be explained in greater detail, the control signal generator is responsive to at least one input signal for generating pulses of programmed wave shapes to modify the rotor poles for controlling an electrical characteristic of the motor or generator portion of the AC machine. A computer may advantageously be used to aid in the control pulse generator.

Application to A.C. Generator

With regard to the AC generator portion of the machine shown in FIGS. 1 and 3, the electrical characteristic which is controlled can be the AC output voltage, the output frequency or both. As will now be explained, the programmed wave shapes for forming poles on the generator magnetic layer 2 can be varied in width (or period), phase, and magnitude to provide the necessary variation or modification of the magnetic poles. Typically, such modification of the poles is required when the rotational speed of the generator varies from the synchronous speed or the output voltage is adversely effected by a load.

Figure 6:
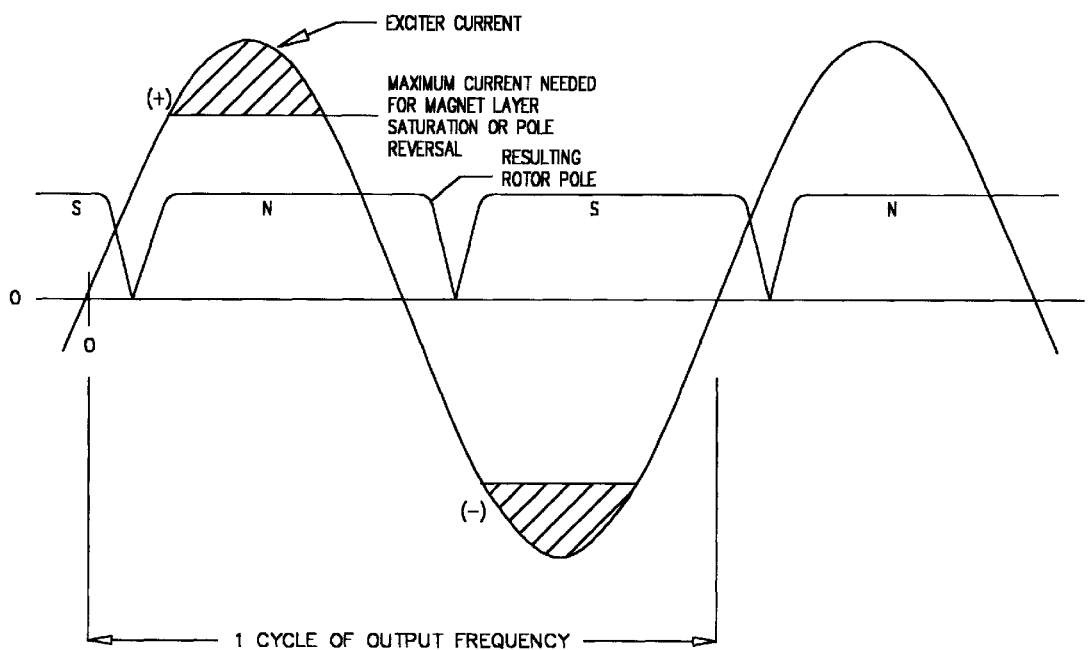
FIG. 6 shows the exciter current and resulting rotor pole as taught in U.S. Pat. No. 4,663,536.

The control current taught in U.S. Pat. No. 4,663,536 magnetizes, or forms, a constant poles per second magnetic pattern in the magnetic layer of the rotor thereby maintaining a controlled frequency output of the generator when the rotational speed is changing. Output voltage phasing control of the generator is accomplished by phase shifting this control signal. Significantly, the magnitude of the control sine wave current in the invention disclosed in U.S. Pat. No. 4,663,536 must reach a minimum level to change the magnetic polarity of the pole on the generator rotor magnetic layer. This causes a lag typically of 30° to 60° between the pole edge thus formed and exciter current, depending on the value of exciter current, as can be seen from FIG. 6. This also results in higher exciter currents than are needed to form the rest of the magnetic pole on the generator rotor. Better performance can be achieved if this delay and the root mean square (rms) value of the exciter current is reduced. As hereinafter described, this can be accomplished by providing a programmed current shape such as that shown in FIG. 9. Other advantages are also realized.

Figure 9:
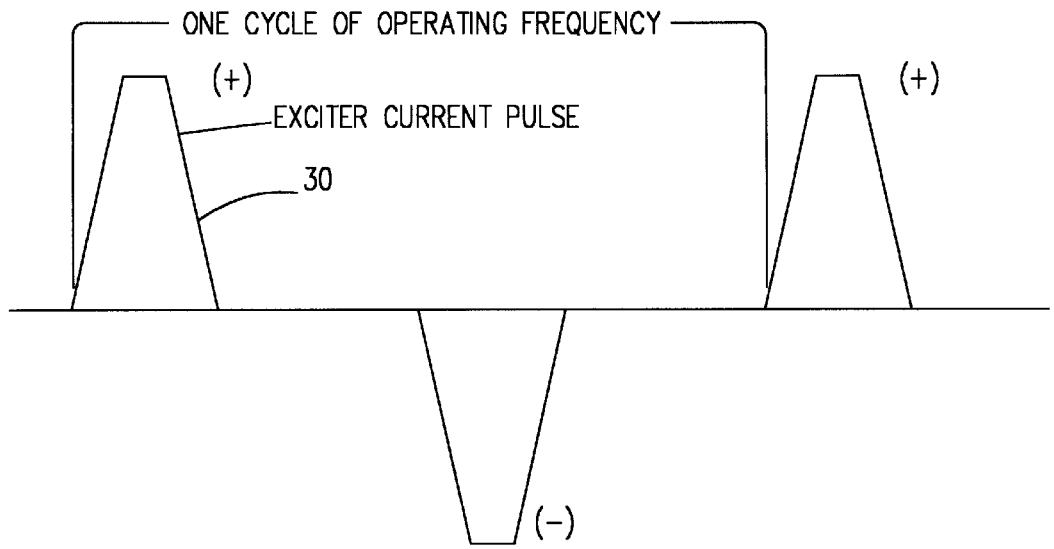
FIG. 9 shows exciter control current wave shapes and resulting rotor pole magnetic strength, position and shape for achieving reduced exciter power and improved control in accordance with the inventive arrangement.

In FIG. 9, the shape and timing of a programmable exciter current pulse 30 is chosen to permit the magnetic poles formed on generator magnetic layer 2 to be selectively modified to accommodate variations in generator rotational speed. In the example shown, the generator exciter coil 14 has been energized with the exciter current pulse 30 in order to reform the edges of the magnetic poles as shown. A negative current pulse is used to energize the exciter coil 14 to reform the edge of the south rotor pole designated "S", concurrently erasing the lagging edge of the adjacent north pole as shown. Similarly, positive current pulses are used to energize the exciter to reform the edge of the north rotor pole designated "N", concurrently erasing the lagging edge of the adjacent south pole as shown.

As shall hereinafter be explained, the width and location of the exciter current pulse 30 at the leading or lagging edge of the rotor magnetic pole is determined by: (1) the speed of the rotor relative to synchronous speed; and, (2) whether the rotor is above or below the synchronous speed. At synchronous speed, alternately leading and lagging pulses may be used to maintain good pole shape.

Figure 10:
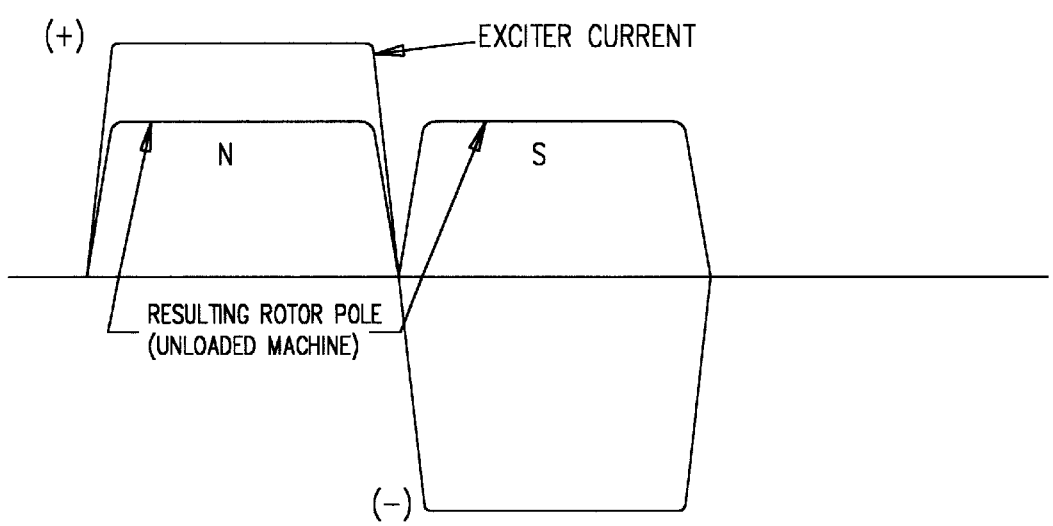
FIG. 10 shows the exciter current and resulting rotor pole when the AC machine is at synchronous speed.

For operation at synchronous speed, the wave shape shown in FIG. 10 is used to establish an initial set of rotor poles on the generator magnetic layer. In this case two poles are established. For a generator rotor needing four poles, the cycle is repeated, establishing a second pair of poles and so on, depending on the number of rotor poles desired. As long as the generator rotor remains at exactly synchronous speed, the pole length and position can remain unchanged and excitation is needed only to control output voltage as described below. If the rotor poles are demagnetized by a severe overload or other machine conditions, the rotor poles can be refreshed, or reestablished, by reapplying exciter current to generator exciter coil 14 as needed.

If the rotor speed moves from synchronous speed, continuous exciter current as shown in FIG. 9 is provided to reform the rotor pole edges in the generator. This maintains a proper pole length for a constant poles/second ratio at the new speed. Significantly, since the magnetic field strength of the poles directly effects the generator output voltage, the magnitude of the exciter current pulse 30 applied to generator exciter coil 14 can also be controlled to determine the output voltage of the machine when operating at other than synchronous speed. This voltage regulation method can be used alone or in combination with other regulating means previously known.

If the new speed is only a few percent from synchronous speed, for example 3510 revolutions per minute (rpm) would be only a 2.5% deviation from a 60 Hz two-pole synchronous speed of 3600 rpm, then the duration of exciter current pulse 30 can be about 15° for pole correction as shown in FIG. 9. This 15° value is calculated based upon the length of the rotor pole which is necessary to ensure that, at the particular motor speed operating speed, a constant ratio of poles per second will be maintained. One pulse per half cycle of the output is shown in FIG. 9. In most cases only one pulse is needed to re-form one pole edge. The pole edge needing correction is determined by whether the rotor is above or below mechanical synchronous speed for the machine's output frequency. The width of the required exciter current pulse increases as the rotor speed drops. The length of the total pole must be reduced with reducing speed to maintain a constant poles per second ratio as at the lower speed. The required exciter current pulse width reaches a maximum at a speed deviation of 33%, or 2400 rpm in this case. With a 60 Hz machine, a speed of 2400 rpm would require a three-pole rotor. A three pole rotor cannot exist in a conventional AC machine, and accordingly, each pole must be completely reformed each revolution.

In practice, normal operation for machine such as that shown in FIG. 1 only requires an ability to tolerate less than a 12.5% speed change. By supplying only the exciter current needed for pole correction at a particular speed, the required rms value of the exciter current is substantially reduced relative to the sine wave current drive used, for example, in U.S. Pat. No. 4,663,536. This greatly reduces the exciter coil losses and required drive power. Efficiency is increased.

Figure 11:
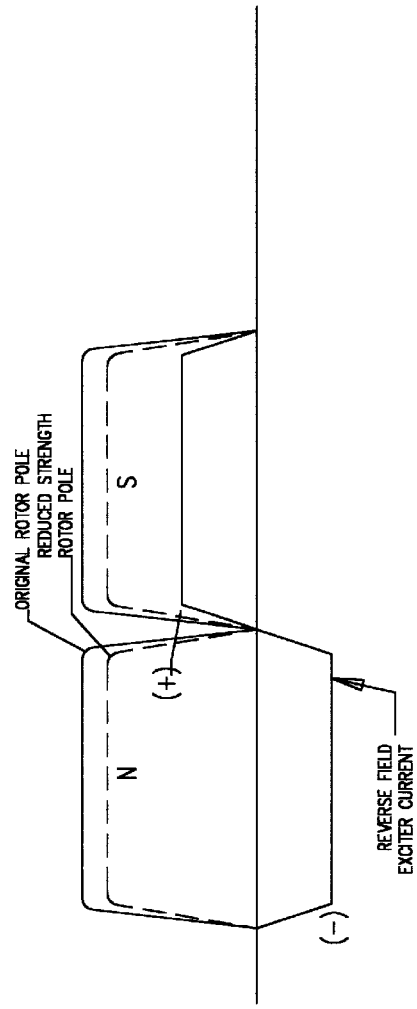
FIG. 11 shows exciter control current for voltage regulation and pole strength modulation at synchronous speed.

The magnetic rotor pole control as described herein has a further advantage as applied to a generator or motor in that it allows generated E.M.F. regulation at synchronous speed without phase shift. This can be accomplished by increasing or decreasing each rotor pole's magnetic field strength value by either applying the exciter current in-phase with the pole (thereby increasing the magnetic field strength) or applying the exciter current in opposition to the rotor pole (thereby decreasing the magnetic field strength). FIG. 11 shows the result of decreasing the strength of the rotor poles in order to reduce the machine's generated E.M.F. With the exciter being controlled on a pole by pole basis, a set of poles may be established that are all the same value. Alternatively, for example, poles of differing value may be established adjacent to each other. Modulation of the rotor poles in this manner enables rotational components in a multi-pole machine to be canceled out of the output voltage wave for improved performance, particularly when the output of the machine is rectified and a low value of ripple voltage is desired. Such a machine is illustrated in FIG. 13.

Figure 13:
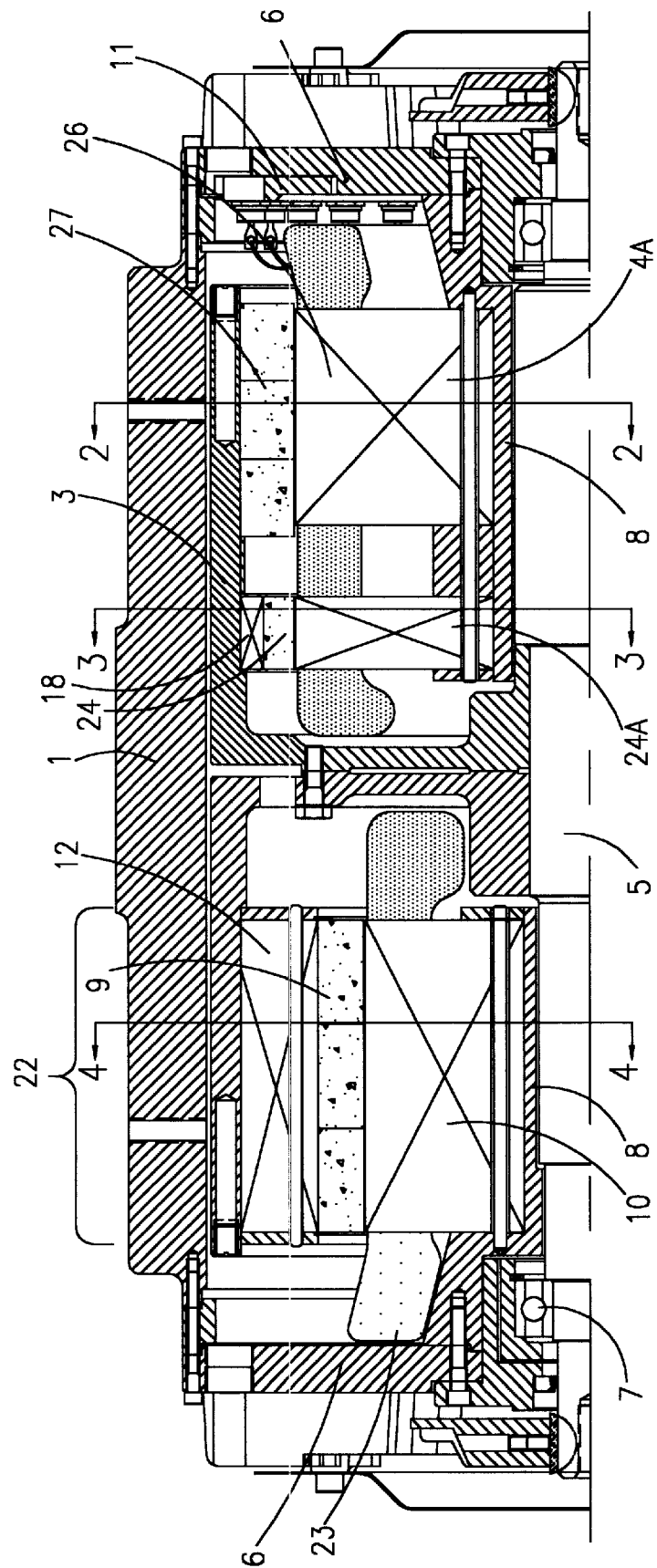
FIG. 13 is a longitudinal cross section, on one side of an axis of symmetry, of a rectified output AC machine which can utilize the improved rotor pole control according to the inventive arrangement.

FIG. 13 shows a machine similar to the one in FIG. 1 except that it is configured for supplying high quality direct current non-interrupted power to a critical load. For convenience, common structure in FIG. 13 is identified with the same reference numerals as in FIG. 1. Similarly, FIGS. 3 and 4 illustrate cross-sectional views of the machine in FIG. 13 as previously described relative to FIG. 1.

The machine in FIG. 13 can particularly benefit from the new rotor pole control method taught herein. In this example, the machine is designed to supply very high quality, tightly regulated direct current to critical loads. As shown, the generator is preferably built with first and second stator and rotor sections which define a controlled pole generator section 24A and fixed pole generator section 26 as shown in FIG. 13. A diode ring 11 is provided to rectify the AC output of the generator.

The controlled pole generator stator section 24A is shown in cross-sectional view in FIG. 3 and is of the same configuration as the controlled pole generator 24 which has already been described relative to FIG. 1. As shown in FIG. 3, stator section 24A contains at least one exciter pole and winding 19 and 14. By comparison, the fixed pole generator section 26 in FIG. 13 has a fixed number of rotor poles and no exciter controls. The main windings 13 preferably extends through both stator sections 24A and 4A. A fixed pole arrangement can be used where the generator output is only intended to supply DC since it is unnecessary to be able to control output frequency under varying non-synchronous speeds. Moreover, any necessary voltage regulation can be accomplished by the controlled pole generator section 24A. Using only a portion of the entire generator to control voltage as shown in FIG. 13, facilitates use of smaller drive currents and therefore improves efficiency.

Figure 2:
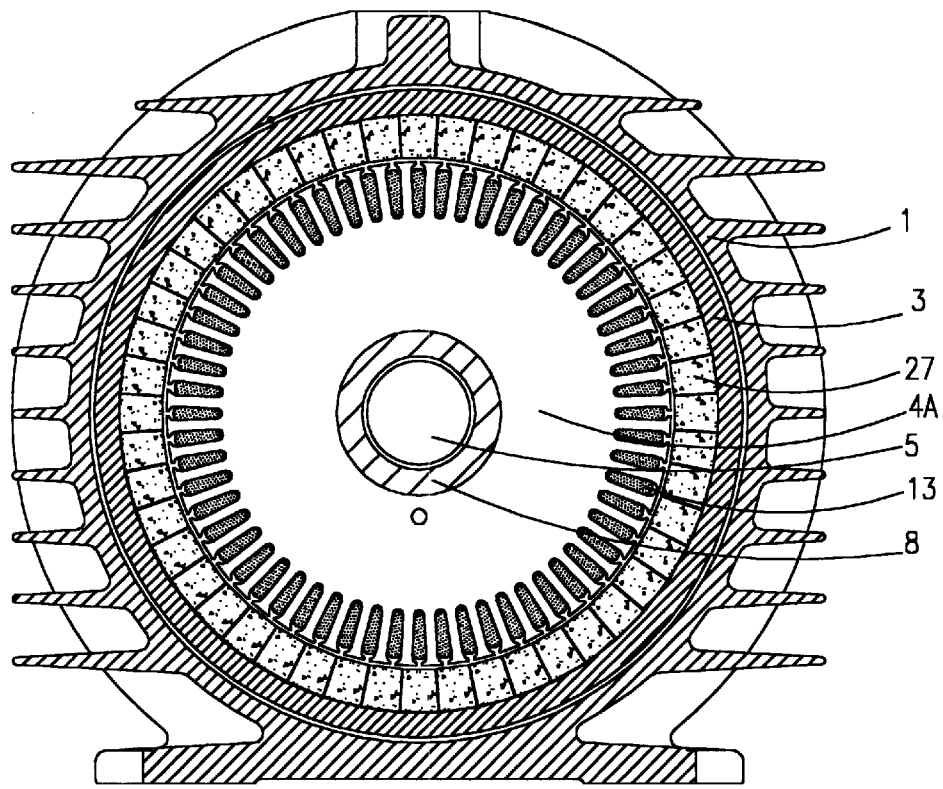
FIG. 2 is a cross section taken along the line 2—2 in FIG. 13, showing a generator fixed rotor pole portion, of the AC machine.

FIG. 2 is a cross-sectional view of the generator taken along lines 2—2 in FIG. 13, showing the portion of the generator with a fixed number of rotor poles and no exciter controls. Significantly, the permanent magnetic material 27 in the fixed pole rotor of FIG. 2 has characteristics similar to the permanent magnet material 17 in FIG. 5 previously described. Magnetic material of this type is chosen so that the rotor poles can be pre-magnetized during construction and will not de-magnetize under any anticipated machine operating conditions. Magnetic material 27 may be comprised of any of a variety of well known high energy ferrite ceramic magnetic materials. However, the invention is not limited in this regard and it may be desirable to use high energy rare earth permanent magnetic materials depending upon the particular application requirements. For example, such materials may include $SmCo_5$, or NdFeB as are well known to those in the field of high energy magnetic materials.

As noted above, the magnetic material used in the controlled pole section of the machine shown in FIG. 3 has typical characteristics as shown in FIG. 8. The magnet material in FIG. 8 has a much lower value of coercive force and is readily magnetized or re-magnetized in an operating machine by the exciters shown. The coercive force is chosen to allow such remagnetization, but is high enough to allow the machine to deliver full load without demagnetization from the main winding current.

In the machine shown in FIG. 13, it is desirable to have a large number of rotor poles present on the rotor for the second generator section 26 in order to minimize ripple in the rectified output. In some cases 10 or more poles may be used for this purpose. With a poly-phase winding in the stator, a large number of poles allows a very low ripple direct current output to be provided by rectifying the stator winding output with the multiple diodes on the diode ring 11.

The rotor poles applied in the controlled pole generator section (24, 24A) are preferably synchronized with those in the fixed pole portion of the generator to regulate output voltage. The controlled poles can be then driven up or down with synchronized alternating polarity current pulses to increase or reduce output voltage. In some cases it may be desirable to supply direct current to the control stator exciter in order to rapidly bring the output voltage to a nominal level. This may be done by providing one exciter winding 19 with AC drive and another exciter winding 19 with DC drive if desired. Further, slight variations in the relative strength of the magnet sections in both the fixed and control sections of the rotor can cause rotational and fundamental frequencies of ripple voltage to appear in the rectified DC output. This condition can be ameliorated by sensing the value and phase of the ripple frequency components and modulating the relative magnetic strength of the magnetic layer in the control portion rotor in order to cancel out these lower frequency components.

Application to Motor Control

The basic programmable magnetic rotor pole control system described above, as applied to generators, can also be used to control electrical operating characteristics of a controlled rotor pole motor 22. As noted above, the motor 22 preferably has two or more adjacent sections which include respectively, a primary motor stator 10 and a secondary motor stator 28. The two stators share a common main motor exciter coil 15 as previously described relative to FIG. 4 and 14. The main exciter coil 15 is primarily utilized to provide rotor magnetic pole control for all rotor sections of motor 22 during acceleration of the motor to synchronous speed. The common main exciter coil 15 is normally not energized at synchronous speed unless the motor rotor field needs restructuring due to an input power disturbance or other condition which affects the total motor rotor magnetic field.

In addition to the common main exciter coil 15 which is shared by the motor stators 10, 28, there is provided only on the secondary motor stator 28 a secondary exciter coil 31 as shown in FIG. 4A. As shown therein, secondary motor stator 28 has a primary exciter pole 21 for main exciter coil 15 and a secondary exciter pole 29 for secondary exciter coil 31. In this case, two exciter pole pieces are shown placed 180° apart; however the invention is not limited in this regard, and more exciters can be used and may preferably be placed at different relative locations depending upon the main motor winding design.

The secondary exciter coil 31 is preferably energized only when the motor is at synchronous speed. A programmable exciter current is provided to the secondary exciter coil 31 to either increase or decrease the magnetic strength of the rotor magnetic layer adjacent to the secondary exciter pole piece. Alternatively, in some cases it may also be desirable to provide a programmable control current to the secondary exciter to phase shift the poles in the motor magnetic layer 9.

Changing the magnetic influence of the motor magnetic layer 9 on the motor windings 23 changes the back E.M.F. generated by the windings 23. A stronger magnetic pole formed on the motor magnet layer 9 will result in a higher back E.M.F. If the E.M.F. is less than the applied line voltage, the input power factor for the motor 22 will be lagging. If the E.M.F. is greater than the line voltage, the input power factor for the motor 22 will be leading. This control could be achieved by applying proper exciter pulses to the common main motor exciter coil 15. However, greatly reduced control power is needed if the length of the secondary motor stator 28 is significantly less, for example 20%, of the length of the primary motor stator 10.

Exciter Current Control System

A system 30 for implementing such control with integrated gate bipolar transistors (IGBT) is shown in block diagram form in FIG. 11. An IGBT can be thought of as a power MOSFET with an added junction in series with the drain. This creates a parasitic transistor driven by the MOSFET and permits increased current flow in the same die area. Ideally, an IGBT combines the low conduction losses of a bipolar junction transistor (BJT) with the switching speed of a power MOSFET. Although IGBT characteristics are desirable for this application, other suitable semiconductor devices may be used.

A frequency, voltage and pole shape control circuit 32 for the system can preferably be implemented by a computer or microprocessor. The circuit 32 supplies IGBT control signals on lines 44, 46, 50 and 52 to isolated IGBT drivers 54, 56, 58 and 60 respectively. The isolated IGBT drivers 54, 56, 58 and 60 drive IGBT transistors 62, 64, 66 and 68 respectively. The transistors are coupled in a bridge configuration with respect to B+ and B− terminals and with respect to exciter coil 14 or 31 and a current detector 69 in series with the exciter coil.

The circuit 32 preferably receives a machine status signal input on line 34, a synchronizing voltage signal from the fixed pole stator or rotor position pickup on line 36, an input voltage or power factor signal on line 38, a voltage regulating signal from the generator output on line 40, an output wave shape and phase (AC output) ripple components and magnitude (DC output) on line 42 and a current feedback signal from the current detector 69 on line 48. A signal indicating output current level may also be provided on either line 40 or 42 where faster response time or other features are desired. It will be recognized that the system as described herein can be used to control both an A.C. output of the generator, or a rectified D.C. output. In the case where a D.C. rectified output is to be provided, a feedback signal from the rectified output can be used to control the system 30. The feedback signal preferably includes information concerning at least the voltage magnitude and ripple components in the D.C. output. Similarly, the system can be used to control the input power factor of the motor 22 based upon the power factor signal input 38. In a preferred embodiment, separate IGBT bridge and associated driver circuitry can be provided for each motor or generator exciter coil, each provided by the circuit 32. Alternatively, a separate control circuit 32 can be used to control each of the IGBT bridge and associated drive circuit.

What is claimed is:

1. An AC machine, comprising a:
   an AC machine rotor with a layer of a re-magnetizable high coercive magnetic material provided thereon;
   an AC machine stator of a soft, low-loss magnetic material having a pole piece and an excitation coil on said pole piece;
   said stator and said rotor rotating relative to one another with a clearance enabling rotor magnetic poles to be selectively reformed on said layer of ret-magnetizable magnetic material by current energizing said excitation coil as said rotor rotates; and
   a control signal generator responsive to at least one input signal for generating pulses of programmed wave shapes which are selectively controlled in width, phase and magnitude as necessary to modify at least one of a location, length, and field intensity of said rotor poles for controlling an electrical characteristic of said AC machine.

2. The machine of claim 1, wherein said rotor has a second layer of re-magnetizable magnetic material and a second stator is provided; and
   said second stator has a second pole piece and a second excitation coil on said second pole piece, said relative rotation of said second stator and said rotor enabling a second set of rotor poles to be formed on said second layer of re-magnetizable magnetic material by current energizing said second excitation coil.

3. The machine of claim 2, wherein said first and second excitation coils are formed of a common electrical winding.

4. The machine of claim 3, further comprising a main AC machine winding, said main AC machine winding extending through both of said first and second stators.

5. The machine of claim 2, further comprising a third excitation coil and a third pole piece, said third excitation coil and pole piece positioned on said second stator.

6. The machine of claim 2 wherein said second magnet layer is comprised of a permanent magnetic material, permanently magnetized into a pole pattern, and the second stator is formed without an exciter pole piece.

7. The machine of claim 1, further comprising a computer for controlling said control pulse generator.

8. The machine of claim 1 wherein said machine is an AC power generator and said electrical characteristic which is controlled is at least one of an AC output voltage and frequency.

9. The machine of claim 8, wherein said input signal is representative of at least one of:
said AC output voltage;
AC output current;
a feedback signal of said current energizing said excitation coil;
machine status;
a synchronizing signal from fixed pole stator position pickup;
a synchronizing signal from a rotor position pickup; and,
output wave shape and phase.

10. The machine of claim 1 wherein said control signal generator generates pulses for selectively reforming leading and lagging edges of said rotor poles.

11. The machine of claim 1 wherein a shape of said pulses is selectively controlled to modify at least one of a location, length and field intensity of said rotor poles.

12. The machine of claim 1, wherein said control signal generator generates pulses to maintain a constant ratio of poles per second at different rotor rotational speeds.

13. The machine of claim 1, wherein said control signal generator generates pulses of varying magnitude for modulating the relative magnetic strength of said layer of magnetizable permanent magnetic material on said rotor.

14. The machine of claim 1, wherein said machine is an AC power generator further comprising a rectifier circuit for converting an AC output to a DC output.

15. The machine of claim 14, wherein said control signal generator regulates said DC output by generating pulses of varying magnitude for modulating the relative magnetic strength of said layer of magnetizable permanent magnetic material on said rotor.

16. The machine of claim 15, further comprising a fixed pole generator stator and rotor section said fixed pole stator and rotor section rotating relative to one another, said fixed pole rotor section having permanent magnetic poles formed thereon.

17. The machine of claim 16 wherein said magnetic material is selected from one of the group of magnetic materials comprising ferrites and rare earth permanent magnetic materials.

18. The machine of claim 14, wherein said input signal is representative of at least one of:
said AC output voltage;
AC output current;
a feedback signal of said current energizing said excitation coil;
machine status;
a synchronizing signal from fixed pole stator position pickup;
a synchronizing signal from a rotor position pickup; and,
output wave shape and phase; and
a rectified DC output voltage and ripple components.

19. The machine of claim 1, further comprising a fixed pole generator stator and rotor section said fixed pole stator and rotor section rotating relative to one another, said fixed pole rotor section having permanent magnetic poles formed thereon.

20. The machine of claim 19 wherein said magnetic material is selected from one of the group of magnetic materials comprising ferrites and rare earth permanent magnetic materials.

21. The machine of claim 1 wherein said machine is an AC motor and said electrical characteristic which is controlled is input power factor.

22. The machine of claim 21, wherein said control pulse generator is responsive to at least one feedback signal representing at least one of:
machine status,
input power factor of said motor; and
power line frequency and phase.

23. The machine of claim 21, wherein said control signal generator generates pulses of varying magnitude for modulating the relative magnetic strength of said layer of magnetizable permanent magnetic material on said rotor.

24. A method for controlling an AC machine, the machine having a rotor with a layer of a re-magnetizable high coercive magnetic material on the rotor and a stator of a soft, low-loss magnetic material having a pole piece and an excitation coil on said pole piece, said stator and said rotor rotating relative to one another with a clearance enabling rotor poles to be selectively re-formed on said re-magnetizable magnetic material as said rotor rotates by current energizing said excitation coil, comprising the steps of:
automatically supplying pulses of programmed wave shapes to said excitation coil for modifying said rotor poles; and
selectively varying said pulses in width, phase and magnitude as necessary to modify at least one of a location, length, and field intensity of said rotor poles for controlling an electrical characteristic of said AC machine.

25. The method of claim 24 wherein said machine is an AC power generator and said electrical characteristic which is controlled is at least one of an AC output voltage, frequency and phase.

26. The method of claim 25, further comprising the step varying said pulses in response to at least one feedback signal representing at least one of:
said AC output voltage;
output current;
a feedback signal representative of said current energizing said excitation coil;
machine status;
a synchronizing signal from a rotor position pickup; and
a rectified DC output voltage and ripple components.

27. The method of claim 25 further comprising the step of generating with said control signal generator pulses for selectively re-forming leading and lagging edges of said rotor poles.

28. The method of claim 25, further comprising the step of generating with said control signal generator pulses for selectively altering physical lengths of rotor poles.

29. The method of claim 25, further comprising the step of generating with said control signal generator pulses to maintain a constant ratio of poles per second at different rotor rotational speeds.

30. The method of claim 25, further comprising the step of generating with said control signal generator pulses of varying magnitude for modulating the relative magnetic strength of said layer of magnetizable permanent magnetic material on said rotor.

31. The method of claim 24 wherein said machine is an AC motor and the electrical characteristic which is controlled is input power factor.

32. The method of claim 27, further comprising the step of varying said pulses in response to at least one feedback signal representing at least one of:
input power factor of said motor; and
power line frequency and phase.

33. The method of claim 32, further comprising the step of generating with said control signal generator pulses of varying magnitude for modulating the relative magnetic strength of said layer of magnetizable permanent magnetic material on said rotor.

34. The machine of claim 24 wherein a shape of said pulses is selectively controlled to modify at least one of a location, length and field intensity of said rotor poles.

* * * * *